United States Patent
Haworth

(10) Patent No.: US 7,284,949 B2
(45) Date of Patent: Oct. 23, 2007

(54) VERTICAL AXIS WIND OR WATER TURBINE

(75) Inventor: Leonard Haworth, Isle of Wight (GB)

(73) Assignee: WaB Energy Systems Limited, Hindhead, Surrey (GB)

( * ) Notice: Subject to any disclaimer, the term of this patent is extended or adjusted under 35 U.S.C. 154(b) by 0 days.

(21) Appl. No.: 10/545,533

(22) PCT Filed: Feb. 6, 2004

(86) PCT No.: PCT/GB2004/000484

§ 371 (c)(1),
(2), (4) Date: Aug. 12, 2005

(87) PCT Pub. No.: WO2004/072473

PCT Pub. Date: Aug. 26, 2004

(65) Prior Publication Data

US 2006/0078416 A1    Apr. 13, 2006

(30) Foreign Application Priority Data

Feb. 15, 2003  (GB) ................ 0303580.5
Feb. 5, 2004   (GB) ................ 0402563.1

(51) Int. Cl.
*F03D 3/06* (2006.01)
(52) U.S. Cl. .................. 415/4.2; 416/17; 416/113
(58) Field of Classification Search ........... 416/117, 416/113, 141, 153, 17, 9, 41, 132 B; 415/4.2
See application file for complete search history.

(56) References Cited

U.S. PATENT DOCUMENTS 1,516,668 A * 11/1924 Burch ................ 416/118
1,581,537 A *  4/1926 Hennigh .............. 416/117
5,083,902 A *  1/1992 Rhodes .............. 416/132 B

FOREIGN PATENT DOCUMENTS

| DE | 3702234 | | 8/1988 |
| FR | 2 805 311 | | 8/2001 |
| GB | 1 561 296 | | 2/1980 |
| GB | 1561296 A | * | 2/1980 |

OTHER PUBLICATIONS

International Search Report for PCT Application No. PCT/GB2004/000484 (3 pages).
Examination Report dated Feb. 7, 2006, from European Patent Office for corresponding European Application No. 04 708 810.9—1267 (4 pages).

* cited by examiner

*Primary Examiner*—Richard Edgar
(74) *Attorney, Agent, or Firm*—Klarquist Sparkman, LLP

(57) ABSTRACT

A mechanical device consisting of two horizontal shafts (4 & 5) in cruciform each rotating axially within two sets of bearings (6), each set positioned near either end and interfaced upon a rotor base (10) which itself is fixed to a vertical power shaft 11 centrally. The powershaft rotates within two other sets of bearings (12). The horizontal shafts are each bolted to and pair of aerofoil section wings (2 & 3) through their respective flange plates (7), each wing being regulated axially by a cam (8) in 90 degree relationship. At any given moment, one wing will always resist (2*b* & 3*b*) the external power source (1) of wind or water current thereby bringing about rotation of the powershaft, whilst the opposite wings (2*a* & 3*a*) will transiently adopt a free flow posture.

22 Claims, 3 Drawing Sheets

VERTICAL AXIS WIND OR WATER TURBINE

CROSS-REFERENCE TO RELATED APPLICATIONS

This is a national stage of International Application No. PCT/GB2004/000484, filed Feb. 6, 2004, which claims the benefit of Great Britain Application No. GB 0402563.1, filed Feb. 5, 2004, and Great Britain Application No. GB 0303580.5, filed Feb. 15, 2003.

FIELD

This invention relates to a wing engine of the wind machine type, though here equally suited to activation by the flow of water as much as the movement of air.

BACKGROUND AND SUMMARY

Wind machine principles are well known; however, such devices can be subject to the disadvantage of their vanes needing to be constantly redirected, through accurate adjustment, onto the ever varying sources of impetus. Furthermore, they derive motive power by deflecting air currents off angled vanes, a process which does not achieve the greater power potential that full face resisting vanes would produce. Equally, a process which creates structural stress, such that these machines must be shut down, using elaborate pitch-control mechanisms, thus rendering themselves incapable of utilizing winds in excess of 70 kilometers per hour. Moreover, elevated structures are a necessity to ensure ground clearance for such vertically sited, rotational devices.

An object of this invention is to provide a wing engine which optimizes the raw energy of received motive power (wind or water—from whatever origin path, without need of directional adjustment) as a result of the paired vanes (wings) being constantly, on an alternating basis, postured in full face resistance to that motive power. Also to convert all motive power, irrespective of its velocity, into powershaft torque rather than structural stress.

Also, this wing engine (unlike a conventional wind machine) operates on the horizontal plane: for this reason, ground clearance towers are unnecessary.

Accordingly, this invention provides a wing engine comprising of two pairs of aerofoils (wings) which are attached by flange plates onto two horizontal shafts, each wing being diametrically apart and set 90°/270° axially to the other. Both horizontal shafts are bearing mounted and secured in cruciform onto a centrally sited rotor base, they are free to pivot through a 90° arc, governed by a cam. Each vane is also supported by suspension stays to the apex of a central suspension tower, itself fixed at its lower end to the rotor base. A vertical axis powershaft proceeds from the rotor base.

The wing engine can be made from a range of metals and plastics or other suitable materials, with particular consideration being afforded the potential for component corrosion or degradation under differing applications and/or deployments.

DETAILED DESCRIPTION OF EXEMPLARY EMBODIMENT

A preferred embodiment of the invention will now be described by way of example and with reference to the accompanying drawings in which.

Figure 1:
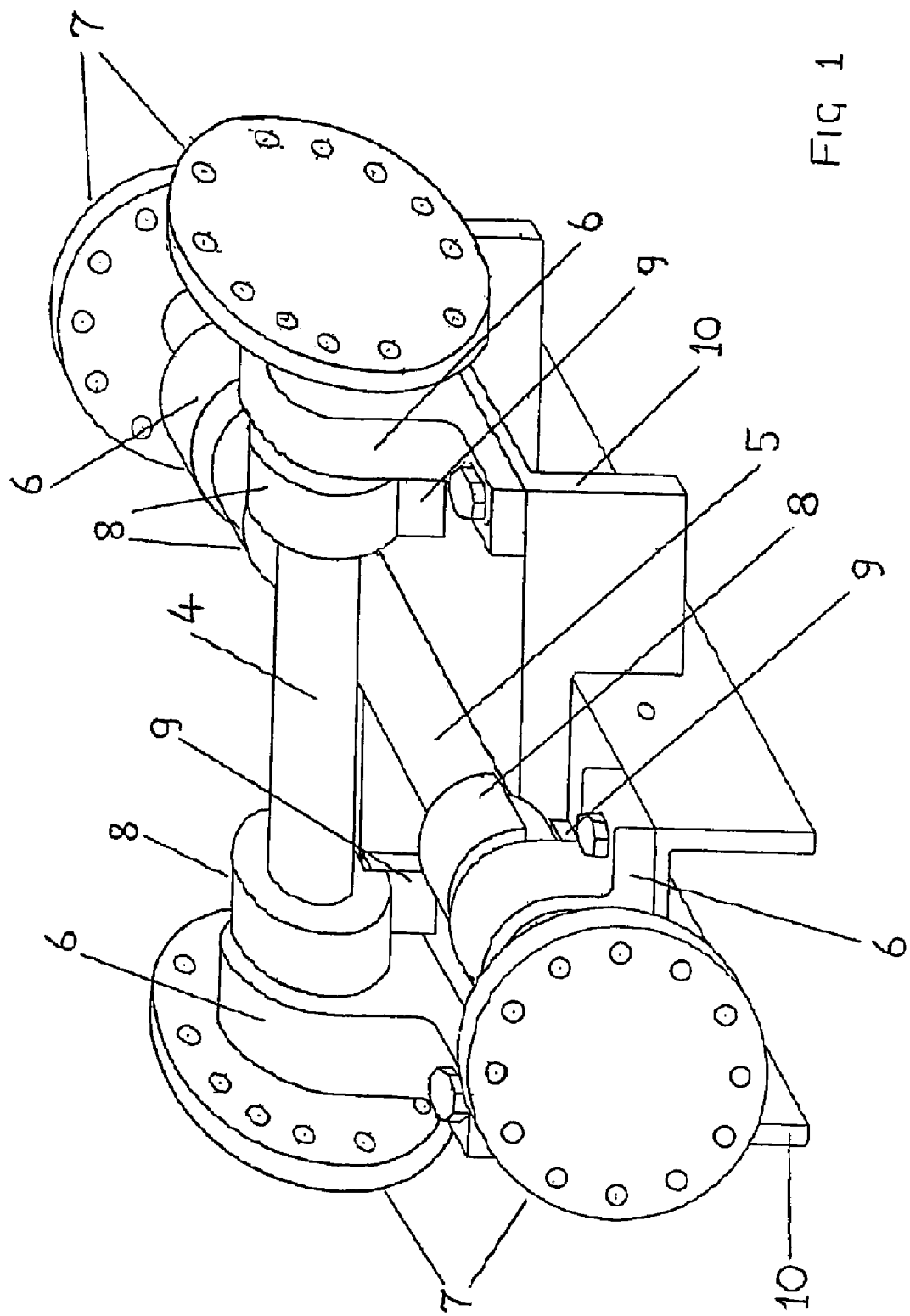
FIG. 1 shows in isometric projection the rotor base assembly, comprising the two horizontal shafts and flange plates, bearings, cams and end stops.
Figure 2:
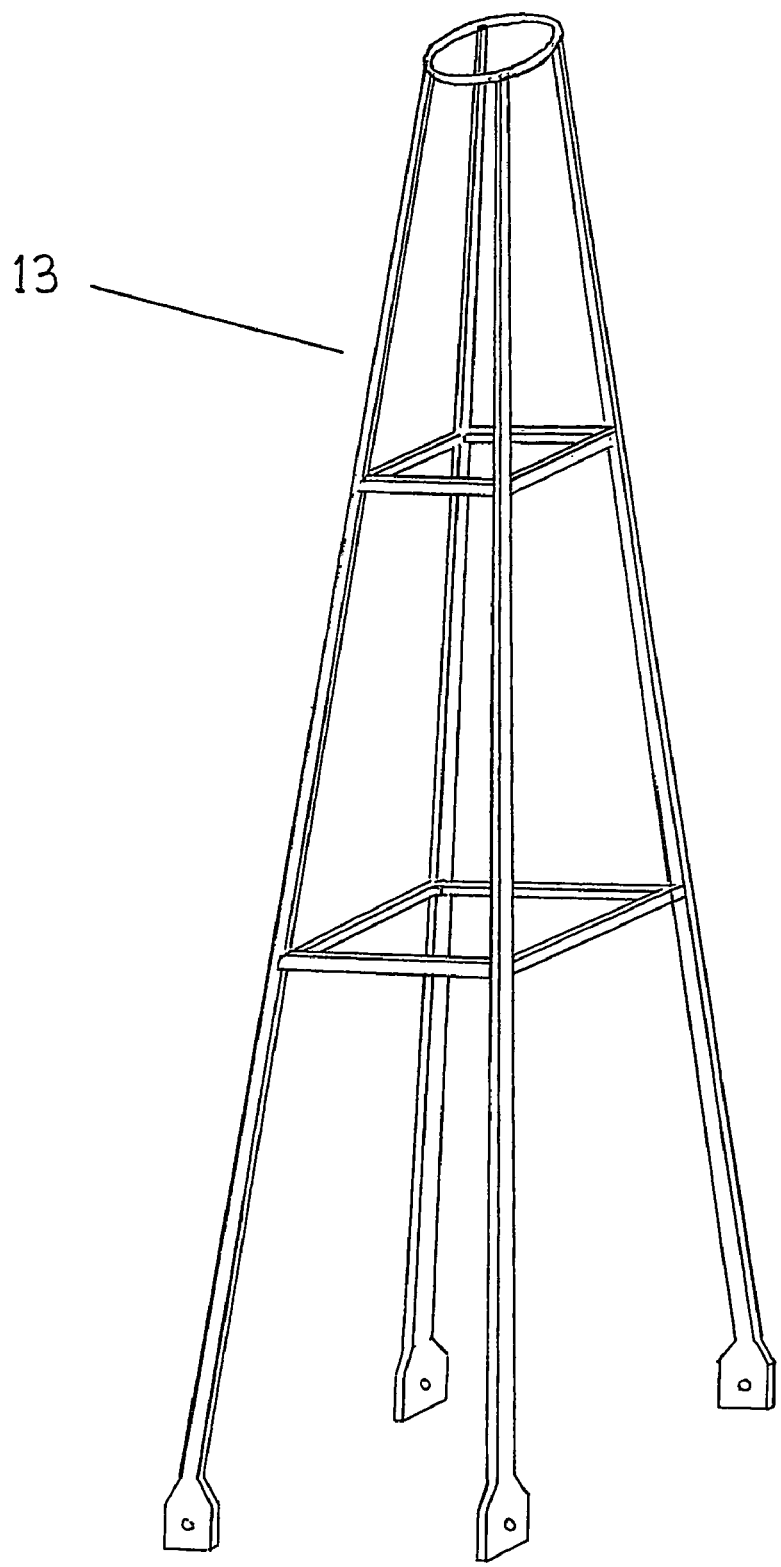
FIG. 2 shows the suspension tower.

Referring to the drawings, the arrival of motive power (wind or water) (illustrated by arrows 1) compels by that powers influence on the wings 2a, 2b and 3a, 3b, as it increases on one (e.g., 2a) and reduces on the other (e.g., 2b) each wing in its turn to readily adopt a full counter-facing posture to the flow 1 (as shown here by 2b and 3b) as the horizontal shafts 4 and 5 are forced into propeller-like revolution.

This is practicable because the bearing 6 mounted horizontal shafts 4 and 5 and fixed flange plates 7 are free to pivot within its 90° axial span, as governed by the cams 8 being arrested on the fixed end stops 9, thereby achieving prescribed posture adoptions as each wing 2a; 2b; 3a; 3b comes into play.

With the horizontal shafts 4 and 5 being centrally mounted atop a rotor base 10 in cruciform and one slightly above the other, then such causation results in the powershaft 11 being turned through its supportive bearings 12a and 12b.

The centrally located suspension tower 13 provides support to each wing 2a, 2b, 3a, 3b by connected steel stays 14 positioned on their pivotal axis.

Figure 3:
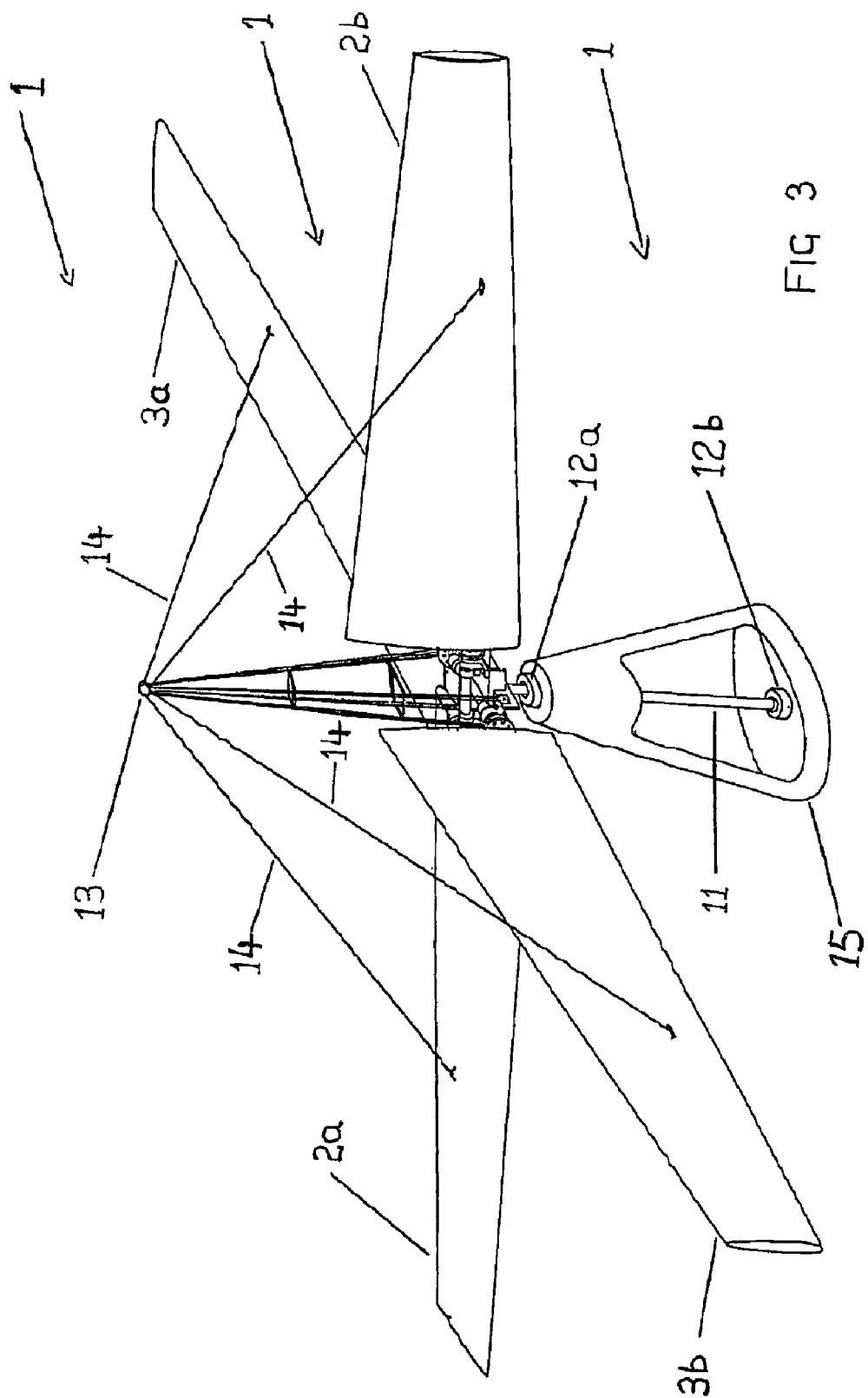
FIG. 3 illustrates the assembled wing engine, the suspension tower bolted to the rotor base, the wings bolted by their flange plates to the flange plates of the horizontal shafts, and the suspension stays connected from the wings to the apex of the suspension tower.

The invention, linked through the power shaft 11 may provide the drive for powering the likes of a compressor (air), pump (water) or generator (electricity) or any similar device. Exampled in FIG. 3 is a base 15 (here shown as a conical shape at random) which could represent anything from a boat to a building, depending on the requirement of this wing engine as a power source.

The invention claimed is:

1. A wing engine comprising two pairs of vanes, each pair of vanes being attached to a respective horizontal shaft, each pair of vanes being diametrically opposed on the respective shaft, each horizontal shaft being mounted immediately adjacent to each other on a common central rotor base which is operative to rotate about a vertical axis, each horizontal shaft being mounted on the rotor base such that each horizontal shaft can pivot through 90° about the respective shaft axis, the pivotal movement of each shaft being governed by a cam such that, in use, one vane of each pair of vanes is at 90° to the other vane in that pair of vanes, wherein each horizontal shaft is mounted on a respective pair of bearings, the bearings being mounted on the rotor base, the bearings in each pair being relatively spaced apart from each other such that each horizontal shaft is supported at two spaced apart positions on the rotor base.

2. The wing engine of claim 1 wherein each vane is supported by suspension stays extending to the apex of a central suspension tower, the tower comprising a plurality of elongated support members extending downwardly from the apex and radially outwardly from the vertical axis, each support member having a lower end portion fixed at a location on the rotor base.

3. The wing engine of claim 1 wherein the rotor base is mounted on top of a vertical axis powershaft extending downwardly from the rotor base.

4. The wing engine of claim 3 further comprising at least one of a compressor, pump or generator, powered by rotation of the powershaft.

5. The wing engine of claim 1 wherein the vanes are attached to the shafts by flange plates.

6. The wing engine of claim 1 wherein, in use, the horizontal shafts are forced into propeller-like revolution, such that one vane of each pair adopts a counter-facing posture to the flow of fluid.

7. The wing engine of claim 1 wherein the movement of the cam is limited by fixed end stops.

8. The wing engine of claim 1 wherein the horizontal shafts are centrally mounted atop the rotor base in cruciform such that the vertical axis extends through the horizontal shafts.

9. The wing engine of claim 8 wherein one horizontal shaft is mounted above the other and each bearing is mounted on a surface portion of the base that is non-parallel to the vertical axis.

10. The wing engine of claim 1 wherein the rotor base comprises first and second support portions arranged in cruciform when viewed in plan, each support portion mounting one of said pairs of bearings on which a respective horizontal shaft is mounted, the vertical axis extending through the first and second support portions.

11. A wing engine comprising:
a base that is operable to rotate about a vertical axis;
at least first and second pairs of bearings mounted on the base, the bearings in each pair being mounted at spaced apart locations from each other, each bearing being mounted on an upwardly facing surface portion of the base;
at least first and second horizontal shafts, each shaft having a respective shaft axis and being mounted on one of said pairs of bearings for rotational movement about its respective shaft axis; and
at least two pairs of vanes, each pair of vanes being attached to a respective one of said horizontal shafts, each pair of vanes being diametrically opposed to each other on the respective shaft, the shafts being supported for rotational movement about their respective shafts such that, in use, one vane of each pair of vanes is rotationally offset about the respective shaft axis from the other vane in that pair of vanes by about 90 degrees;
wherein the horizontal shafts, the vanes, the bearings, and the base rotate about the vertical axis when a flow of fluid imparts a motive power onto the vanes.

12. The wing engine of claim 11, wherein each horizontal shaft is operable to rotate with respect to its shaft axis through an arc no greater than about 90degrees.

13. The wing engine of claim 11 wherein each vane is supported by suspension stays extending to the apex of a central suspension tower, itself fixed at its lower end to the base.

14. The wing engine of claim 11 wherein a vertical axis powershaft extends from the base.

15. The wing engine of claim 14 further comprising at least one device powered by rotation of the powershaft.

16. The wing engine of claim 11 wherein the vanes are attached to the shafts by flange plates.

17. The wing engine of claim 11 further comprising fixed stops positioned to limit rotation of each shaft about its shaft axis through an arc of about 90degrees.

18. The wing engine of claim 11 wherein the horizontal shafts are mounted atop the base in cruciform.

19. The wing engine of claim 11 wherein one horizontal shaft is mounted above and in close proximity to the other.

20. The wing engine of claim 11 wherein the base comprises first and second support portions arranged in cruciform when viewed in plan, each support portion mounting one of said pairs of bearings on which a respective horizontal shaft is mounted, wherein the vertical axis extends through the first and second support portions.

21. A wing engine comprising:
a vertically upright power shaft operable to rotate about a vertical axis;
a base that is mounted on top of the power shaft and operable to rotate about the vertical axis, the base comprising first and second support portions arranged in cruciform when viewed in plan;
first and second pairs of bearings mounted on the first and second support portions, respectively, of the base, the bearings in each pair being mounted at spaced apart locations from each other, the bearings being mounted on upwardly facing surfaces of the first and second support portions of the base, the vertical axis extending through the upwardly facing surfaces;
first and second horizontal shafts, each shaft having a respective shaft axis and being mounted on one of said pairs of bearings for rotational movement about its respective shaft axis; and
two pairs of vanes, each pair of vanes being attached to a respective one of said horizontal shafts, each pair of vanes being diametrically opposed to each other on the respective shaft, the shafts being supported for rotational movement about their respective shafts such that, in use, one vane of each pair of vanes is rotationally offset about the respective shaft axis from the other vane in that pair of vanes by about 90 degrees;
first and second pairs of stops mounted on the first and second support portions, respectively, of the base;
each horizontal shaft having a pair of cams mounted thereon that rotate about the shaft axis of the respective shaft, each cam being positioned relative to one of said stops such that clockwise rotation of each shaft is limited by contact between one of said cams in the respective pair and one of said stops and counterclockwise rotation of each shaft is limited by contact between the other said cams in the respective pair and another of said stops;
a central suspension tower comprising a plurality of elongated support members extending downwardly from an apex portion of the tower and extending radially outwardly from the vertical axis, each support member having a lower end portion fixed at a location on the rotor base;
a plurality of suspension stays for supporting the vanes, each suspension stay extending downwardly from the apex portion of the tower to a respective vane;
wherein the horizontal shafts, the vanes, the bearings, the tower, and the base rotate about the vertical axis when a flow of fluid imparts a motive power onto the vanes.

22. The wing engine of claim 21, wherein the first support portion of the base is nested within the second support portion of the base.

* * * * *